UNITED STATES PATENT OFFICE.

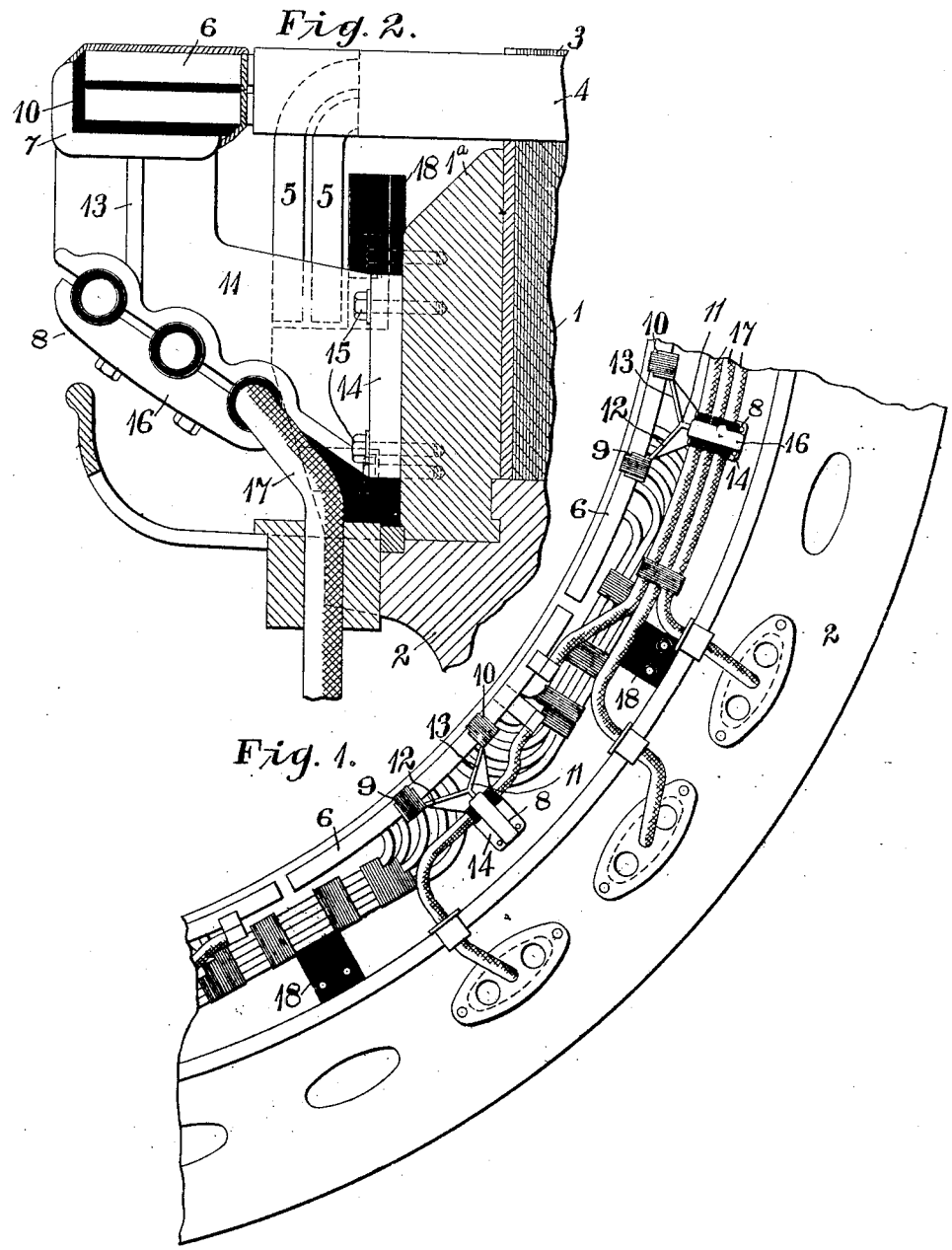

ISRAEL L. GRIFFITH, OF PITTSBURG, PENNSYLVANIA, ASSIGNOR TO WESTINGHOUSE ELECTRIC & MANUFACTURING COMPANY, A CORPORATION OF PENNSYLVANIA.

COIL-SUPPORT FOR DYNAMO-ELECTRIC MACHINES.

No. 905,868.  Specification of Letters Patent.  Patented Dec. 8, 1908.

Application filed June 28, 1905. Serial No. 267,466.

*To all whom it may concern:*

Be it known that I, ISRAEL L. GRIFFITH, a citizen of the United States, and a resident of Pittsburg, in the county of Allegheny and State of Pennsylvania, have invented a new and useful Improvement in Coil-Supports for Dynamo-Electric Machines, of which the following is a specification.

My invention relates to dynamo-electric machines and particularly to supporting means for the ends of coils that project beyond the core slots of such machines.

The object of my invention is to provide means for the support of coil ends which shall effectually prevent warping or displacement of the coils under mechanical and electro-magnetic strains and which shall maintain a high degree of insulation.

Tests have shown that the portions of armature coils which project beyond the core slots may be subjected to enormous strains which tend to violently distort the coils and inflict serious damage to them in case the armature is short-circuited. This distortion may be explained as the reaction, upon each other, of stray magnetic fields which are set up by the excessive short-circuited electric currents in different sets of armature coils, since the tendency is apparently greatest in machines having comparatively few poles, and in which the ampere turns are concentrated in a small number of groups, such as high speed turbo-generators. The explanation included herein is not set forth as necessarily stating the correct reason for the coil distortion, but is merely intended to present a reasonable theory for what takes place when coils that are not properly supported are short-circuited.

In order to meet the above specified conditions, I have devised supports which have such form and arrangement and are so combined with the armature frame, core and winding as to successfully resist all tendency to displacement of said winding, or any part thereof, in any direction.

My invention is illustrated in the accompanying drawing, in which

Figure 1 is a partial end elevation of a stationary armature equipped with coil supports constructed in accordance therewith, and Fig. 2 is a partial section through the armature core which further discloses one of the coil supports shown in Fig. 1.

Referring to the drawings, an armature core 1 is supported by an end plate 1ª and a frame 2, and is provided with a plurality of slots 3 in which a winding 4 is placed. The conductors in each slot are insulated from each other and are bound together, in the usual manner, to form a series of coils.

The windings of stationary, polyphase armatures involve some special disposition of the end connections of the windings, since the windings of one phase overlap the windings of another phase; that is, if one phase winding is considered as the main winding, the other phase windings may be considered as interpolar windings.

In order to avoid interference of the end connections, it is usual to bend the coils away from the center of the core and let the end connections follow a circumferential path concentric with the core face and slightly farther from the center than the bottoms of the slots. The coils from the interpolar slots may then be carried out in straight lines until the first set is avoided and then take a similar form in a plane more distant from the frame.

In the same way, all the windings of different phases which are included within the first polar winding may be successively carried out and bent away from the center. However, it is obviously unnecessary to bend down the last set, so that the end connections often follow a circumferential path that is concentric with the core face and of substantially equal radius.

The winding illustrated in the accompanying drawings has for every pole one group of end connections 5 that are bent away from the core center after leaving the slots and one straight group of end connections 6. Each coil support 8 comprises a pair of insulating angle strips 9 and 10, a metal bracket 11 having two laterally projecting arms 12 and 13 provided with angular seats 7 to receive the insulating strips and hold them in engagement with the straight coil ends 6, a base plate 14 which is fastened to the end plate 1ª by a plurality of bolts 15 and a detachable cleat 16, which is grooved to receive and support a series of cross-connecting conductors 17. The coil portions 6 may be further fastened in position by means of cord wrapped around them and the bracket portions 7, as shown.

The groups of end connections 5 that are bent away from the center of the core are supported by a plurality of notched insulating blocks 18, which are fitted against the outer, cylindrical surface of the coils, and extend between the coils and the plate 1ᵃ, to which they are bolted.

Although the coil support of my invention is illustrated, for convenience, in connection with a specific arrangement of armature coils, I desire it to be understood that any changes in the arrangement of the coils or in the size or shape of the support which do not materially alter the purpose or the results obtained, are within the scope of my invention.

I desire it to be further understood that my invention may be utilized in connection with either direct or alternating current generators or motors and for supporting the windings of either stationary or movable machine members, provided the structural and operative conditions warrant such use.

I claim as my invention:

1. A coil-support comprising a pair of insulating strips, a supporting bracket having a plurality of divergent arms to engage said strips, a base plate and means for fastening said plate to a rigid body.

2. A coil-supporting bracket comprising a base plate, a plurality of divergent arms projecting therefrom, a detachable cleat having a plurality of grooves, and means for clamping the bracket to a rigid body.

3. In a dynamo-electric machine, the combination with a slotted, magnetizable core, a supporting frame therefor and a winding having portions which project beyond the core slots, of an annularly disposed set of brackets each of which has a plurality of arms provided with seats to receive and support the two outer sides of the projecting portions of the winding, and insulating strips interposed between said seats and the winding.

4. In a dynamo-electric machine, the combination with a slotted, magnetizable core, a supporting frame therefor and a winding having portions which project beyond the core slots, of an annularly disposed set of supporting brackets each of which has a plurality of arms having angular seats to receive and support the two outer sides of the projecting portions of the winding, means for rigidly fastening said brackets to said supporting frame, and angular insulating strips located between the bracket seats and the winding.

5. In a dynamo-electric machine, the combination with a slotted, magnetizable core, a supporting frame therefor and a winding partially included in the core slots and having a plurality of external end connectors which are substantially concentric with said core, of supporting means for said end connectors comprising a plurality of insulating strips, and a plurality of brackets each of which has a base plate, means for fastening the same to said core frame and two arms extending therefrom to hold said insulating strips in engagement with said end connectors.

6. In a dynamo-electric machine, the combination with a slotted, magnetizable core, a supporting frame therefor, a winding partially included in the core slots and having external end connectors substantially concentric with said core and a plurality of cross-connecting conductors disposed substantially concentric with the end connectors, of means for supporting said end connectors and said cross-connecting conductors that comprises a plurality of brackets which are clamped to said core frame and are severally provided with two projecting arms to engage the end connectors, a detachable cleat which is grooved to receive the cross-connecting conductors, and means for clamping the cleat to the bracket.

7. In a dynamo-electric machine, the combination with a slotted, magnetizable core, a supporting frame therefor and a winding comprising coils which project beyond the ends of the core slots and are connected by curved portions comprising two groups, those of one group being located relatively near to the core but remote from the slots, and those of the other group being located relatively remote from the core and in the path of a circle concentric with that of the core face and of approximately the same radius, of means for supporting said last named portions comprising a plurality of insulating strips, and a plurality of brackets that are clamped to the core frame and are provided with supporting arms which hold the insulating strips in engagement with said end portions.

8. A coil-support for dynamo-electric machines comprising a bracket having a base plate and two divergent arms provided with expanded coil seats at their ends, and insulating strips in said seats.

9. In a dynamo-electric machine, the combination with a slotted core, and coils located in the core slots and projecting beyond the ends thereof, of a supporting means for the coil ends comprising a set of brackets having base plates and divergent arms provided with expanded coil seats, insulating strips in said seats, and means for binding the coil ends to said strips.

In testimony whereof, I have hereunto subscribed my name this 23rd day of June 1905.

ISRAEL L. GRIFFITH.

Witnesses:
BENJAMIN H. GLOVER,
BIRNEY HINES.